United States Patent
Martinez et al.

(10) Patent No.: US 8,625,157 B2
(45) Date of Patent: Jan. 7, 2014

(54) IDENTIFYING A COLOR PROFILE FOR AN ILLUMINANT

(75) Inventors: Oscar Martinez, Castelldefels (ES); Brett E Dahlgren, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1087 days.

(21) Appl. No.: 12/604,731

(22) Filed: Oct. 23, 2009

(65) Prior Publication Data

US 2011/0096343 A1 Apr. 28, 2011

(51) Int. Cl.
*H04N 1/40* (2006.01)

(52) U.S. Cl.
USPC .............................. 358/1.9; 358/2.1

(58) Field of Classification Search
USPC ........... 358/1.9, 2.1, 400, 500, 406, 504, 461, 358/468
See application file for complete search history.

(56) References Cited

U.S. PATENT DOCUMENTS

| 5,081,529 | A * | 1/1992 | Collette .................. 358/504 |
| 7,148,995 | B2 | 12/2006 | Martinez et al. |
| 2001/0019433 | A1 | 9/2001 | Matsushiro et al. |
| 2005/0068550 | A1 | 3/2005 | Braun |
| 2008/0137114 | A1* | 6/2008 | Sanami .................. 358/1.9 |
| 2008/0259374 | A1 | 10/2008 | Mestha et al. |
| 2009/0009766 | A1 | 1/2009 | Bonino et al. |
| 2009/0284812 | A1* | 11/2009 | Tsukamoto ............ 358/518 |
| 2010/0195127 | A1* | 8/2010 | Sawada ................. 358/1.9 |

\* cited by examiner

*Primary Examiner* — Thomas D Lee
*Assistant Examiner* — Stephen M Brinich
(74) *Attorney, Agent, or Firm* — Jack H. McKinney

(57) ABSTRACT

A method includes collecting, within a printer body, ambient light entering the printer body. Characteristics of the collected ambient light are measured. A color profile based on the measured characteristics is identified. The identified color profile is provided for use in forming a color image on a medium.

20 Claims, 6 Drawing Sheets

IDENTIFYING A COLOR PROFILE FOR AN ILLUMINANT

BACKGROUND

Printer users, especially graphic arts professionals, rely on consistent and accurate color reproduction. To the human eye, the appearance of a printed color image changes depending upon the characteristics of the light illuminating the image. To optimize color reproduction of a printer, device specific color profiles are used to transform print jobs into physical printed images. A given printer's color profile reflects various characteristics. Those characteristics include the type of colorant used to form printed images, the type of media on which the image is formed, and the illumination under which the printed output is to be viewed. Thus, to optimize color reproduction, a color profile designed for the viewing illuminant, the printer's ink, and the print media is identified and then utilized to form printed color images.

Colorant and media types are easily identifiable. An illuminant is not. Often, a printer's color profile simply presumes a standard viewing illuminant such as D50. Other printers allow a user to select a color profile that corresponds to a desired illuminant manually identified by the user. If the user cannot identify the illuminant, the user can purchase an external sensor such as a spectrophotometer to measure and identify the illuminant of the environment in which the printed output is to be viewed. Such a procedure is not user friendly and can prove expensive.

DRAWINGS

DETAILED DESCRIPTION

Utilizing an integrated spectrophotometer, a printer analyzes colors formed on a print medium. The analysis typically involves comparing measured colors against intended colors. Based on the analysis, the printer identifies a color profile for accurately and consistently transform color information from a print job into the device's own local color space. The color profile typically accounts and/or corrects for various characteristics including, for example, the type of colorants and the type of print media being used. An example of a standardized device color profile format is provided by the International Color Consortium (ICC).

The particular illumination under which an image is viewed affects an individual's perception of color. In other words, the same printed color can appear different under different lighting conditions. As a consequence, a color profile also takes into account a viewing illuminant. Often the viewing illuminant is presumed to be D50. Such a presumption is often not optimal and many times undesirable. Various embodiment discussed below utilize a printer's integrated spectrophotometer to identify an illuminant and a color profile for use in producing color output.

The following description is broken into sections. The first, labeled "Environment," describes exemplary printer in which embodiments may be implemented. The second section, labeled "Components" describes various physical and logical components utilized to implement various embodiments. The third section, labeled as "Operation", describes steps taken to implement various embodiments.

Figure 1:
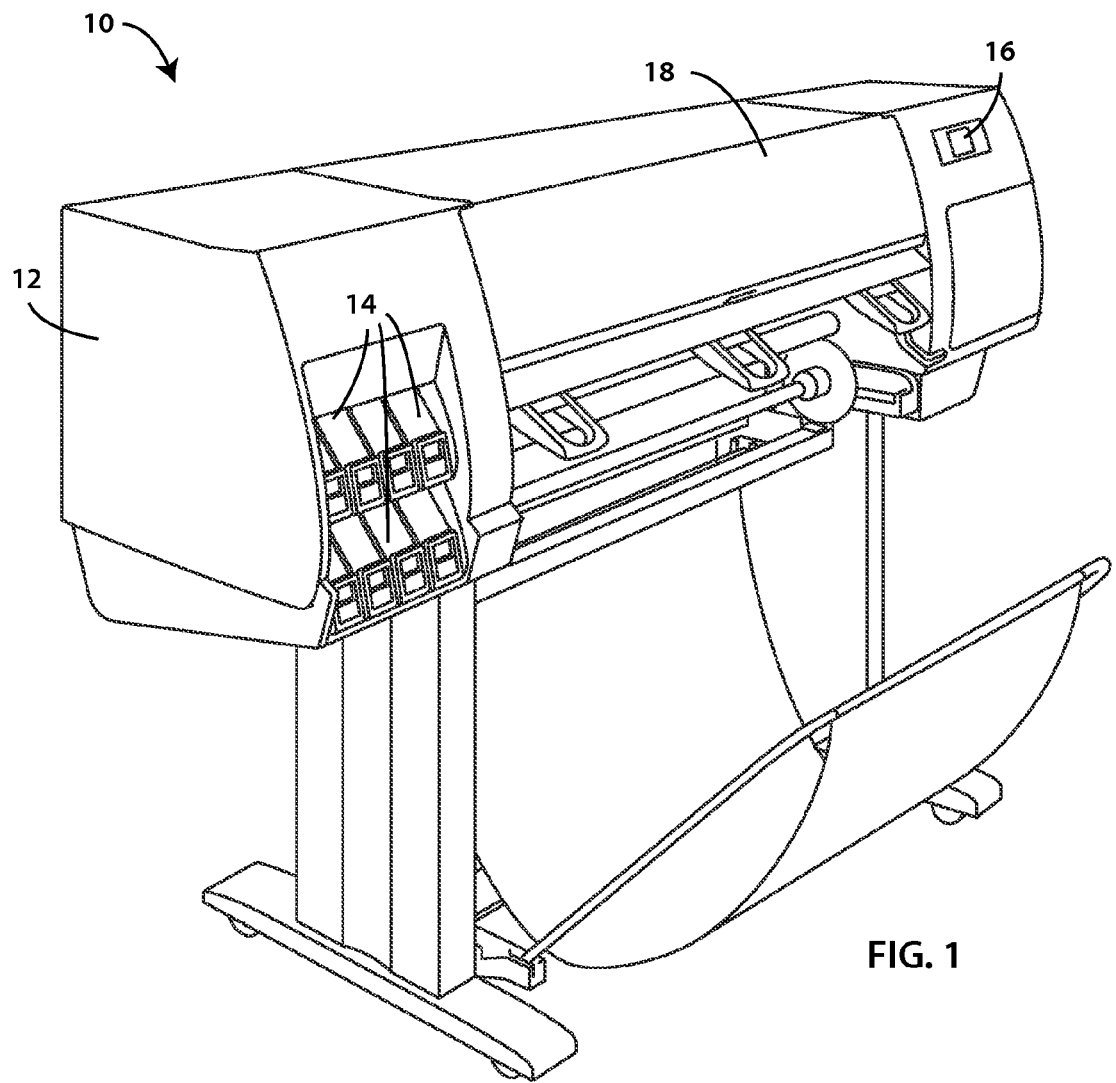
FIGS. 1-2 depict an exemplary printer in which embodiments may be implemented.

Environment:

FIG. 1 depicts exemplary printer 10 in which embodiments may be implemented. While printer 10 is depicted as a large format color printer, embodiments may be implemented in color printers of other types. In the example of FIG. 1, printer 10 is shown to include body 12, colorant supply 14, user interface 16, and front cover 18. Body 12 represents the physical shell that encompasses internal printing components (seen in FIG. 2) of printer 10. Colorant sources 14 represent generally containers storing different colorants used by printer 10 to form color images. In the Example of FIG. 1, colorant sources 14 are designed to hold ink. In other examples, colorant sources might contain toner or other substances for forming color images. User interface 16 represents generally one or more physical controls through which a user is able to provide instructions to printer 10. Front cover 18 represents generally a portion of body that can be repositioned to expose internal printing components of printer 10.

Figure 2:
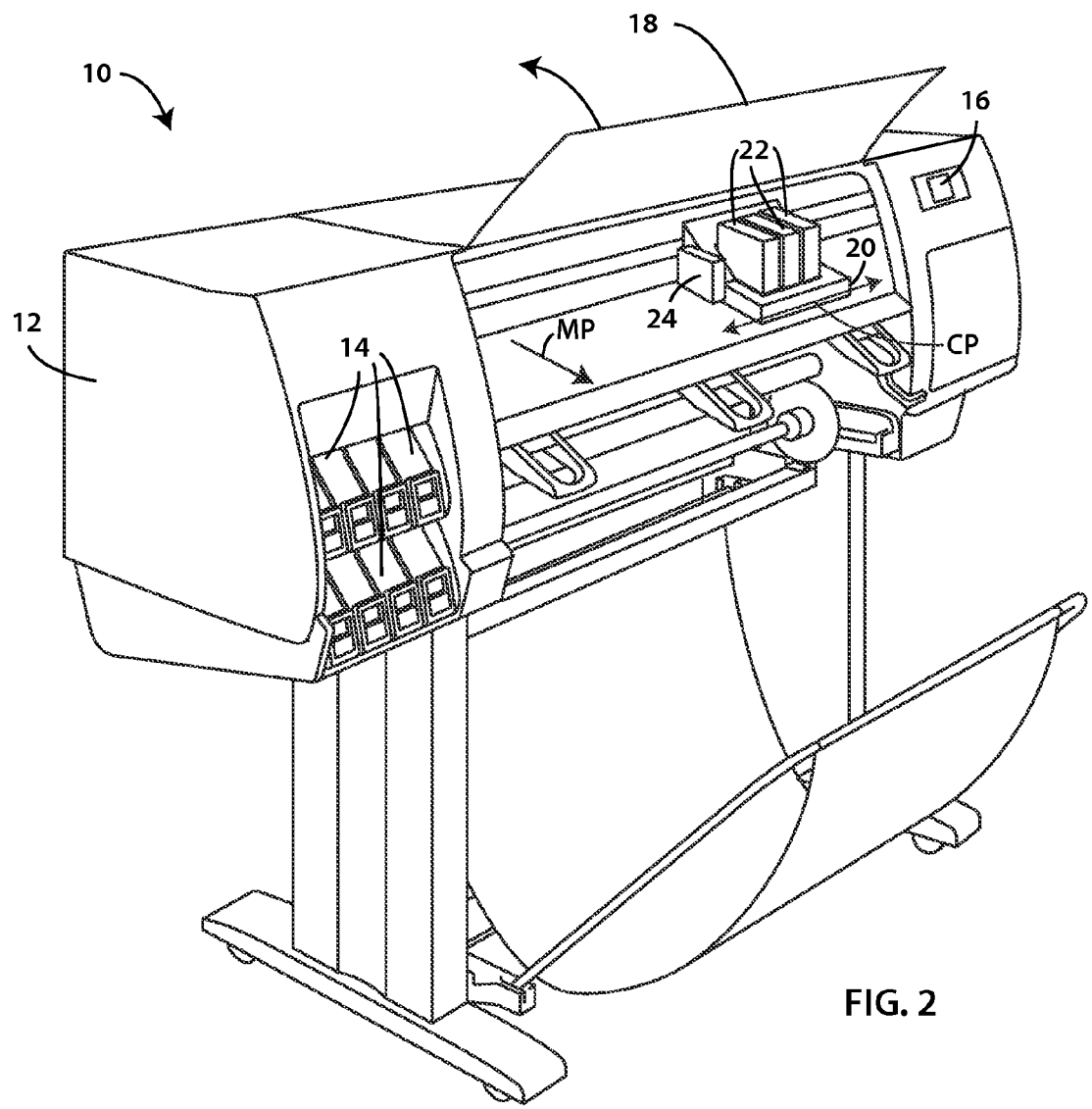

Referring to FIG. 2, front cover 18 has been opened to reveal internal printing components identified as carriage 20, print heads 22, and color sensor 24. Carriage 20 represents generally a component designed to hold print heads 22 while being moved back and forth along a carriage path (CP). Print heads 22 represent generally components designed to selectively dispense colorants on a print medium being urged along media path (MP). Color sensor 24 represents generally a component configured to measure color characteristics of images formed by print head 22 on a print medium. In a particular example, color sensor 24 is a spectrophotometer capable of being utilized to measure a power spectral distribution. In the examples of FIG. 2, color sensor 24 is coupled to carriage 20. In other example, color sensor 24 may be a stationary component positioned within body 12.

Figure 3:
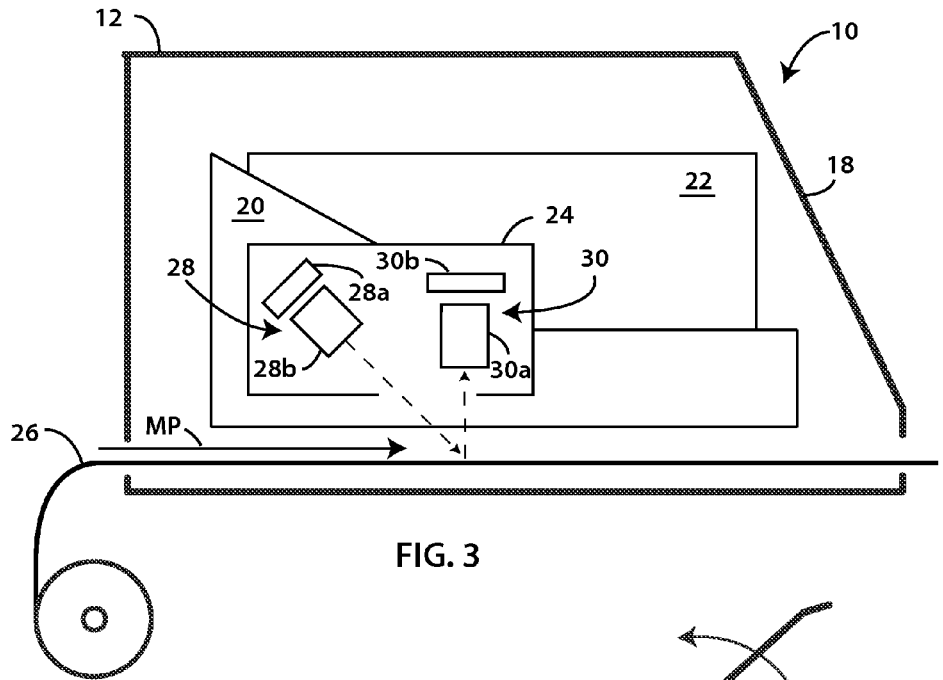
FIGS. 3-4 depict side views of an exemplary printer utilizing a spectrophotometer in various operational modes according to embodiments.
Figure 4:
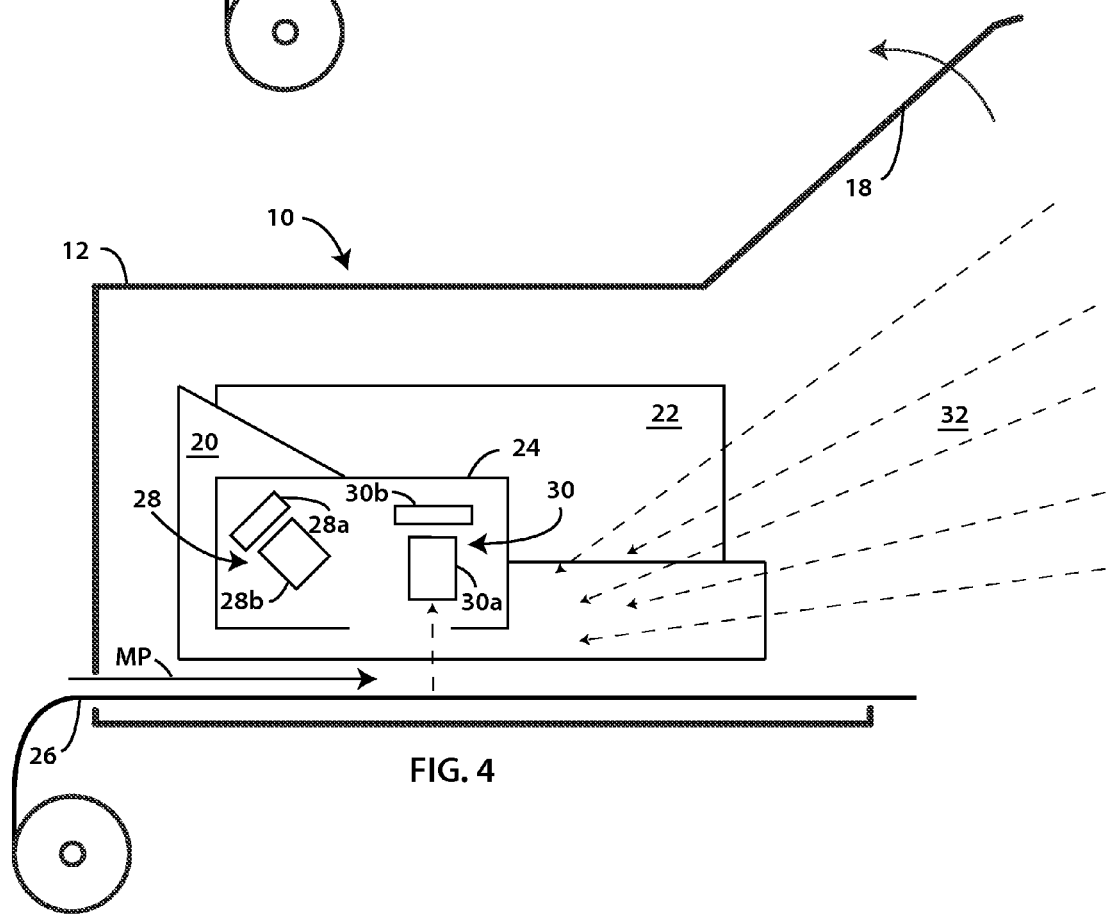

FIGS. 3 and 4 are partial side schematic views of printer 10 depicting internal printing components 20, 22, and 24 and print media 26 traveling along media path (MP). In FIG. 3, color sensor 24 is operating in a first mode. Color sensor 24, depicted as a spectrophotometer, includes light source 28 and spectrometer 30. Light source 28 includes light source 28a and projection optics 28b. Projection optics 28b are configured to focus light from source 28a onto a target on print medium 26. Spectrometer 30 includes collection optics 30a and sensor 30b. Collection optics 30a are configured to collect light reflected from the target on print medium 26 and communicate the reflected light onto sensor 30b. Sensor 30b, for example, may include a number of filtered sensors each designed to produce a response with respect to a particular range of wavelengths. Thus, the integrated output from the sensor 30b represents the power spectral distribution of the collected reflected light and can be used to accurately identify the color of the target.

Moving to FIG. 4, front cover 18 has been opened to allow color sensor 24 to operate in a second mode. With front cover 18 open, ambient light 32 is allowed to enter printer body 12. Light source 28 is turned off, and spectrometer collects and measures ambient light 32. As noted above, sensor 30b can include a number of filtered sensors each designed to produce a response with respect to a particular range of wavelengths.

Thus, sensor 30b produces an output that measures the power spectral distribution of ambient light 32. Using the output from color sensor 24, a particular illuminant serving as a source of the ambient light can be identified and used to identify an appropriate color profile for printer 10. The term "identify" as it is used with respect to a color profile can mean recognizing an existing profile that corresponds to the identified illuminant. It can also mean generating a color for the identified illuminant. The term "illuminant" as used herein can refer to a single illuminant or to a combination of illuminants.

Figure 5:
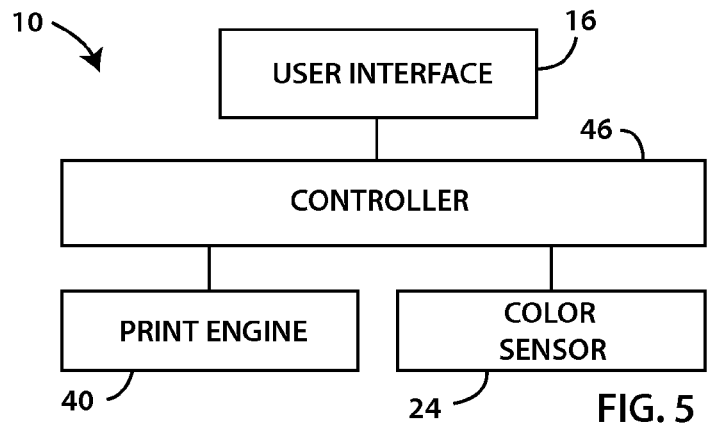
FIG. 5 is a block diagram depicts various physical logical components of a printer according to an embodiment.

Components:

FIG. 5 is a block diagram depicting an example of the various physical and logical components of printer 10 capable of identifying and utilizing a color profile for the ambient illuminant of an environment in which printer 10 is placed. Printer 10 is depicted to include print engine 40, color sensor 24, user interface 16, and controller 46. Print engine 40 represents generally the physical components designed to form printed images on a medium. Referring back to FIGS. 1 and 2, such components can include carriage 20, print heads 22, colorant supplies 14 and the like. Color sensor 24 represents generally the physical component designed to produce an output that measures the color of a target. Such a target, for example, may be a printed patch formed print engine 40 on a print medium. The output of color sensor 24 can be a measure of a power spectral distribution of light collected by the sensor. User interface 16 represents the physical components such as buttons, touch screens, and the like through which a user communicates instructions to printer 10.

Controller 46 represents generally a combination of hardware and programming configured to communicate signals to and receive signals from print engine 40, color sensor 24, and user interface 16. Described in more detail with respect to FIG. 6, controller 46 is responsible for determining an operational mode of color sensor 24. In a first mode, controller 46 utilizes color sensor 24 to measure a color a target formed by print engine 40 on a print medium. In a second mode, controller 46 utilizes color sensor 24 to identify an illuminant of an environment in which printer 10 placed. The operational mode of color sensor 24 may be set by a user interacting with user interface 16. By default, controller 46 may identify color sensor 24 as operating in the first mode. Manipulation of user interface 16 may later be interpreted by controller 46 to cause color sensor 24 to operate in the second mode.

Figure 6:
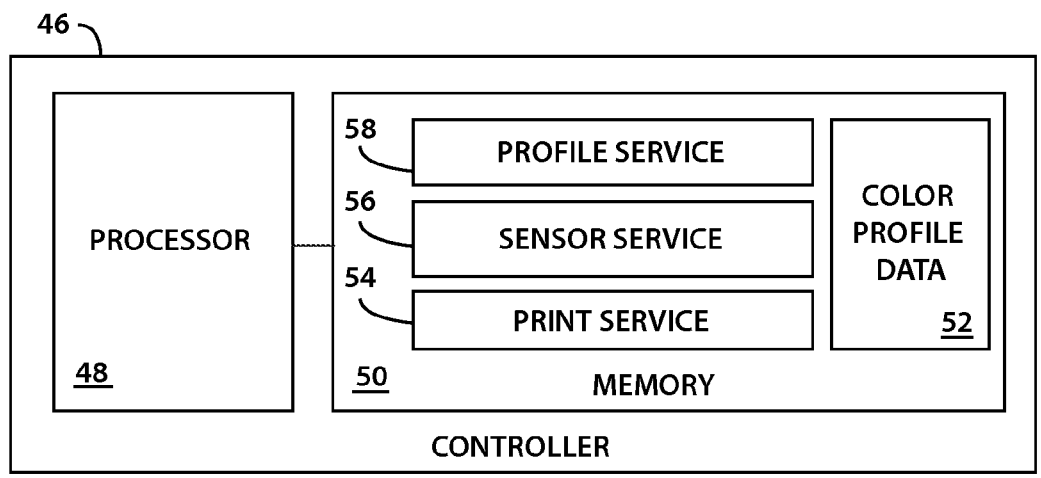
FIG. 6 is a block diagram depicting a controller according to an embodiment.

FIG. 6 is a block diagram depicting the physical and logical components of controller 46. As shown controller 46 includes processor 48 and memory 50. Processor 48 represents generally any process capable of executing program instruction stored in memory 50. Execution of those instructions causes processor 48 to interact, at least indirectly, with print engine 40, color sensor 24, and user interface 16 instructing those components to perform selected tasks. Such tasks include causing color sensor 24 to measure ambient light and utilizing a color profile for the ambient light to cause print engine 40 to form a desired image utilizing a on a print medium.

In the example of FIG. 6, memory 50 is shown to include profile data 52, print service 54, sensor service 56, and profile service 58. Profile data 52 includes one or more color profiles as well as data used to identify a color profile. For example, such data may be used to identify a color profile that corresponds to a particular illuminant. Print service 54 represents program instructions for causing print engine 40 of FIG. 5 to form desired color images on a print medium. When executed by processor 48, print service 54 utilizes an identified color profile from color profile data 50 to form color images. That is, print service 54 receives a color print job and utilizes the identified color profile to map colors of the print job to the color space of the printer. In this manner, the colors reproduced by the printer are accurate representations of the colors in the print job.

Sensor service 56 represents program instructions for causing color sensor 24 of FIG. 5 to collect light so that characteristics of the collected light can be measured and used to identify a color profile. In a first operational mode, the collected light is light reflected from a selected target often formed on a print medium. In a second operational mode, the collected light is ambient light. Color sensor 24 can be positioned within the body of a printer. FIGS. 1-4 provide examples. As such, the ambient light collected in the second mode originates from an illuminant present in the environment in which the printer is placed and enters the printer body to reach color sensor 24.

Further, color sensor 24 may be a spectrophotometer that includes a light source and a spectrometer. FIGS. 3 and 4 provide an example. When operating in the first mode, sensor service 56 causes the light source to emit light onto the target. That light reflects from the target and is collected by the spectrometer. When operating in the second mode, sensor service 56 prevents the light source from emitting light allowing the spectrometer to collect ambient light entering the printer body through an opening such as front cover 18 of FIGS. 1-4.

Profile service 58 represents program instructions for processing the output of color sensor 24 to measure characteristics of the collected light and to identify a color profile based on the measured characteristics. When executed by processor 48, profile service 58 interacts with sensor service 56. Through that interaction, color sensor 24 is caused to collect light. Profile service 58 processes output from color sensor 24 to measure characteristics of the collected light. In the first operational mode, the measured characteristics are those of light reflected from a target. In the second operational mode, the measured characteristics are those of ambient light reaching color sensor 24. Based on the particular operational mode and the measured characteristics of the collected light, profile service updates color profile data 52 accordingly. The update may involve recognizing an existing color profile contained in color profile data 52 for use by print service 54. The update may include generating a color profile and adding it to color profile data 52 for use by print service 54.

As noted above, color sensor 24 may be a spectrophotometer that includes a light source and a spectrometer. In such a case, the characteristics measured by profile service 58 are a power spectral distribution of the collected light. In the second operational mode, profile service 58 may identify a color profile in a number of manners. In a first such example, profile service 58 interacts with sensor service 56 to cause color sensor 24 to collect light in at least two instances. In both instances sensor service 56 prevents the light source from emitting light. In one instance, sensor service 56 causes the spectrometer to close a shutter preventing any light from being collected, and profile service 58 measures a first power spectral distribution. In another instance, sensor service 56 causes the spectrometer to open the shutter allowing the ambient light to be collected, and profile service 58 measures a second power spectral distribution. Profile service 58 then identifies a color profile based on a third power spectral distribution that is a function of the first and second power spectral distributions. In particular, that function may involve subtracting the first distribution from the second.

In a second example, color sensor 24 is positioned adjacent to a media path within a printer body. FIGS. 1-4 provide an example. Again, color sensor 24 is a spectrophotometer that includes a light source and a spectrometer. Profile service 58 interacts with sensor service 56 to cause color sensor 24 to collect light in at least two instances. In one instance, sensor service 56 allows the light source to emit light. The emitted light is reflected from one of a print medium and a platen positioned in the media path. The reflected light is collected by the spectrometer. From the output of the spectrometer, profile service 58 measures a first power spectral distribution. In another instance, sensor service 56 prevents the light source from emitting light allowing only ambient light entering the printer body to be collected by the spectrometer. From the output of the spectrometer, profile service 58 measures a second power spectral distribution. Profile service 58 then identifies a color profile based on a third power spectral distribution that is a function of the first and second power spectral distributions. In particular, that function may involve subtracting the first distribution from the second.

Figure 7:
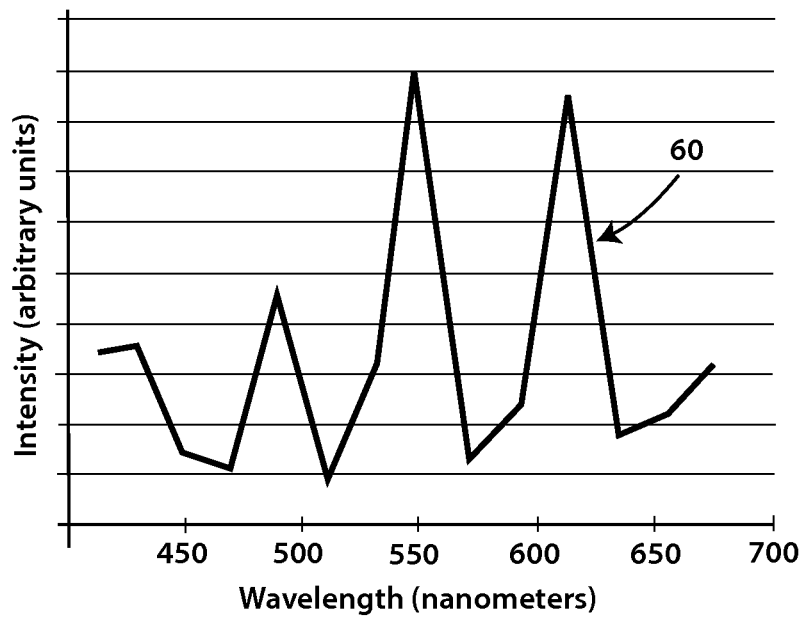
FIG. 7 is an exemplary graph charting a power spectral distribution of an ambient light source.

FIG. 7 is a chart depicting a power spectral distribution 60 measured during a second operational mode. In other words, distribution 60 is representative of ambient light entering a printer body. As one can see, distribution 60 peaks at about 488 nm, 545 nm, and 612 nm. Such is representative of fluorescent lighting. Thus, profile data 52 may associate peaks of a given power spectral distribution with a known illuminant or combination of illuminants. Profile service 58 accesses profile data 52 to identify an illuminant associated with the peaks of a given distribution and then identifies a color profile for the identified illuminant to be used by print service 54.

Figure 8:
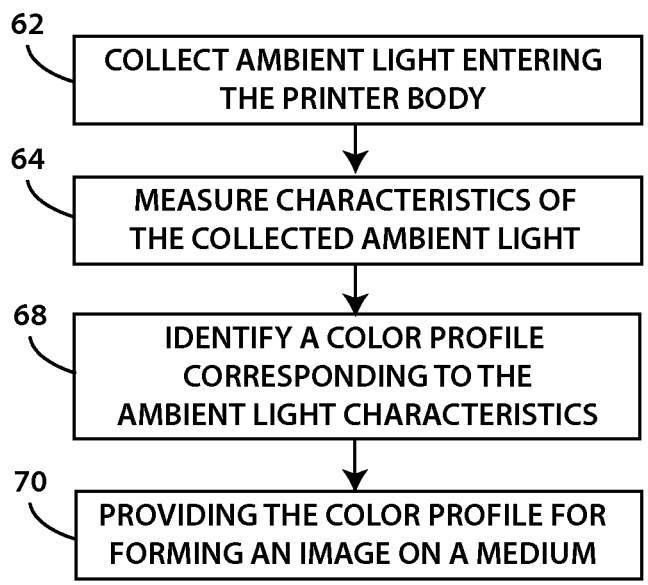
FIGS. 8-9 are exemplary flow diagrams depicting steps taken to implement various embodiments.
Figure 9:
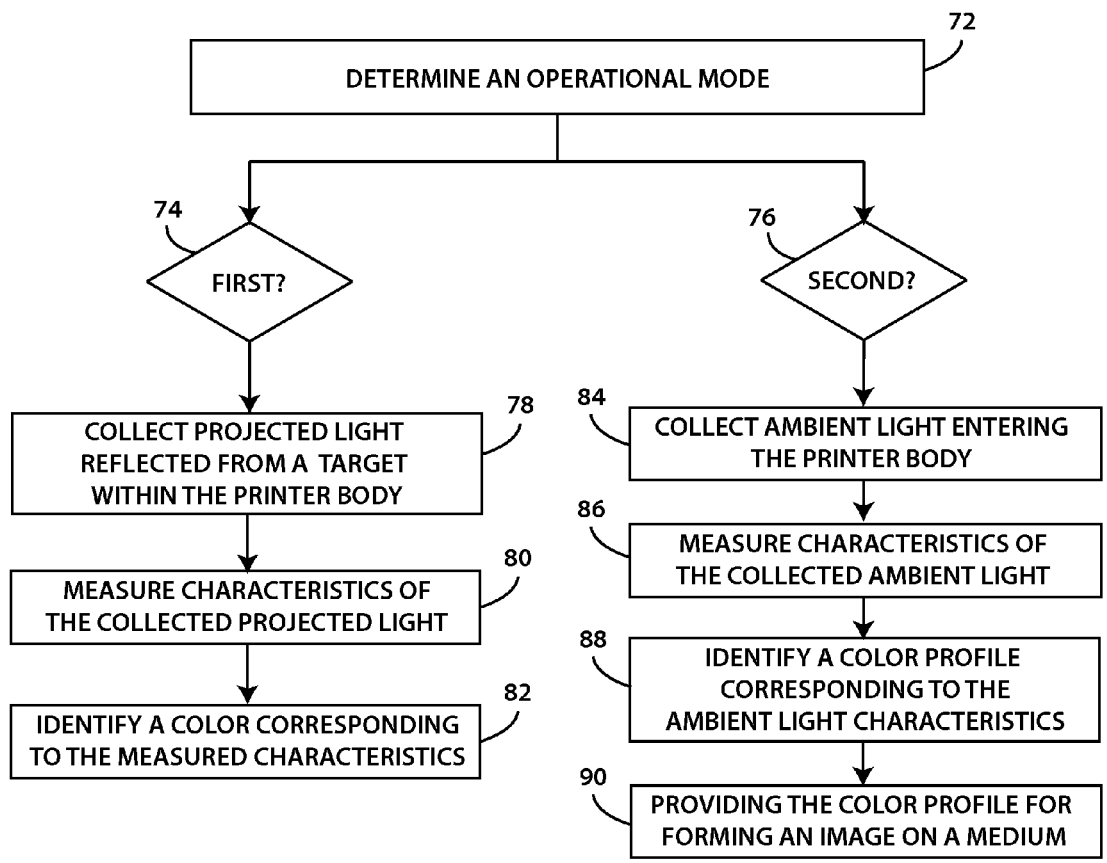

Operation:

FIGS. 8-9 are exemplary flow diagrams of steps taken to implement various embodiments. In discussing FIGS. 8-9, reference may be made to the diagrams of FIGS. 1-7 to provide contextual examples. Implementation, however, is not limited to those examples.

Starting with FIG. 8, ambient light entering the printer body is collected (step 62). Referring to FIGS. 1-6, front cover 18 of printer 10 is open allowing color sensor 24 to collect ambient light 32 entering printer body 12. Referring to FIG. 4 in particular, color sensor 24 is a spectrophotometer that includes light source 28 and spectrometer 30. In this example, step 62 can include preventing light source 28 from projecting light while causing spectrometer to collect ambient light.

Characteristics of the measured ambient light are measured (step 64). Referring to FIGS. 1-6, color sensor 24 produces an output reflective of the collected ambient light 32. From this output, controller 46 (FIGS. 5 and 6) measures characteristics of the light. Where, as in FIGS. 3 and 4, color sensor 24 is a photospectrometer, the measured characteristics can be a power spectral distribution of the ambient light such as distribution 60 in FIG. 7.

A color profile is identified based on the ambient light characteristics (step 68). Referring to FIGS. 1-7, the ambient light characteristics can be unique to a particular illuminant. A power spectral distribution for a given illuminant has peaks at various known wavelengths or ranges of wavelengths. In such an example, controller 46 identifies an illuminant having peaks matching the power spectral distribution measured in step 68. Controller 46 then identifies a color profile for the identified illuminant. Again, identifying a color profile step 68 can include recognizing an existing color profile or generating a color profile.

As noted above, color sensor 24 may be a spectrophotometer that includes a light source and a spectrometer. In such a case, the characteristics measured in step 64 are a power spectral distribution of the collected light. In step 68, the color profile may be identified in a number of manners. In a first such example, step 62 would include collecting light in at least two instances. In both instances the light source is prevented from emitting light. In one instance, the spectrometer is caused to close a shutter preventing any light from being collected, and a first power spectral distribution is measured in step 64. In another instance, the shutter is opened allowing the ambient light to be collected, and a second power spectral distribution is measured in step 64. In step 68, a color profile is identified based on a third power spectral distribution. That third power spectral distribution is a function of the first and second power spectral distributions. In particular, the function may involve subtracting the first distribution from the second.

In a second example, color sensor 24 is positioned adjacent to a media path within a printer body. FIGS. 1-4 provide an example. Again, color sensor 24 is a spectrophotometer that includes a light source and a spectrometer. Step 62 includes collecting light at least two instances. In one instance, the light source is allowed to emit light. The emitted light is reflected from one of a print medium and a platen positioned in the media path and collected by the spectrometer, and a first power spectral distribution is measured in step 64. In another instance, the light source is prevented from emitting light allowing only ambient light entering the printer body to be collected by the spectrometer and a second power spectral distribution is measured in step 64. In step 68, a color profile is identified based on a third power spectral distribution that is a function of the first and second power spectral distributions. In particular, that function may involve subtracting the first distribution from the second.

The identified color profile is then provided for use in forming a color image on a print medium (step 70). Step 70, for example, may involve updating color profile data 52 to include or otherwise specify the color profile identified in step 68. Referring to FIGS. 1-6, controller 46 causes print engine 40 to form a color image in print medium 26. In doing so, controller 46 receives a print job defining the color image. Controller 46 utilizes the provided color profile to map colors of the print job to the color space of printer 10. Using this mapping, controller 46 communicates printing instructions to print engine 40 causing print engine 40 to form a color image on a print medium and optimized to be viewed under current lighting conditions.

FIG. 9 is a flow diagram depicting steps taken in which a printer's internal color sensor is selectively utilized in one of two operational modes. Initially, an operational mode is determined (step 72). In the first operational mode, the color sensor is utilized to identify a color of a target. In the second operational mode, the color sensor is used to identify an illuminant lighting the environment in which the printer has been placed. The operational mode may be selected by a user by interacting with the printer's user interface.

Upon a first mode determination, projected light reflected from a target within the printer body is collected (step 78). Referring to FIGS. 1-6 and in particular FIG. 4, color sensor 24 may be a spectrophotometer that includes light source 28 and spectrometer 30. Light source 28 projects light onto a target formed on print medium 26. Spectrometer 30 collects light reflected from the target and produces a corresponding output.

Characteristics of the light collected in step 78 are measured (step 80). Referring to FIGS. 4-6, controller 46 receives the output from color sensor 24 and measures characteristics of the reflected light. Where as in FIGS. 3 and 4, color sensor 24 is a photospectrometer, the measured characteristics can be a power spectral distribution of the reflected light. Controller 46 can then identify a color based on the characteristics measured in step 80 (step 82). Controller 46 can then use the identified color to identify a color profile for use in forming color images.

Upon a second mode determination, ambient light entering the printer body is collected (step 84). Referring to FIGS. 1-6, front cover 18 of printer 10 is open allowing color sensor 24 to collect ambient light 32 entering printer body 12. Referring to FIG. 4 in particular, color sensor 24 is a spectrophotometer that includes light source 28 and spectrometer 30. In this example, step 84 can include preventing light source 28 from projecting light while causing spectrometer 30 to collect ambient light.

Characteristics of the measured ambient light are measured (step 86). Referring to FIGS. 1-6, color sensor 24 produces an output reflective of the collected ambient light 32. From this output, controller 46 (FIGS. 5 and 6) measures characteristics of the light. Where, as in FIGS. 3 and 4, color sensor 24 is a photospectrometer, the measured characteristics can be a power spectral distribution of the ambient light such as distribution 60 in FIG. 7.

A color profile is identified based on the ambient light characteristics (step 88). Referring to FIGS. 1-7, the ambient light characteristics can be unique to a particular illuminant. A power spectral distribution for a given illuminant has peaks at various known wavelengths or ranges of wavelengths. In such an example, controller 46 identifies an illuminant having peaks matching the power spectral distribution measured in step 86. Controller 46 then identifies a color profile for the identified illuminant. Again, identifying a color profile step 68 can include recognizing an existing color profile or generating a color profile.

As noted above, color sensor 24 may be a spectrophotometer that includes a light source and a spectrometer. In such a case, the characteristics measured in step 86 are a power spectral distribution of the collected light. In step 88, the color profile may be identified in a number of manners. In a first such example, step 84 would include collecting light in at least two instances. In both instances the light source is prevented from emitting light. In one instance, the spectrometer is caused to close a shutter preventing any light from being collected, and a first power spectral distribution is measured in step 86. In another instance, the shutter is opened allowing the ambient light to be collected, and a second power spectral distribution is measured in step 86. In step 88, a color profile is identified based on a third power spectral distribution. That third power spectral distribution is a function of the first and second power spectral distributions. In particular, the function may involve subtracting the first distribution from the second.

In a second example, color sensor 24 is positioned adjacent to a media path within a printer body. FIGS. 1-4 provide an example. Again, color sensor 24 is a spectrophotometer that includes a light source and a spectrometer. Step 84 includes collecting light at least two instances. In one instance, the light source is allowed to emit light. The emitted light is reflected from one of a print medium and a platen positioned in the media path and collected by the spectrometer, and a first power spectral distribution is measured in step 86. In another instance, the light source is prevented from emitting light allowing only ambient light entering the printer body to be collected by the spectrometer and a second power spectral distribution is measured in step 86. In step 88, a color profile is identified based on a third power spectral distribution that is a function of the first and second power spectral distributions. In particular, that function may involve subtracting the first distribution from the second.

The identified color profile is then provided for use in forming a color image on a print medium (step 90). Step 90, for example, may involve updating color profile data 52 to include or otherwise specify the color profile identified in step 88. Referring to FIGS. 1-6, controller 46 causes print engine 40 to form a color image in print medium 26. In doing so, controller 46 receives a print job defining the color image. Controller 46 utilizes the provided color profile to map colors of the print job to the color space of printer 10. Using this mapping, controller 46 communicates printing instructions to print engine 40 causing print engine 40 to form a color image on a print medium and optimized to be viewed under current lighting conditions.

CONCLUSION

The diagrams of FIG. 1-4 are used to depict an exemplary printer in which various embodiments may be implemented. Implementation, however, is not so limited. FIGS. 5-6 show the architecture, functionality, and operation of various embodiments. Various components illustrated in FIGS. 5-6 are defined at least in part as programs or program instructions. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present invention can be embodied in any storage medium for use by or in connection with an instruction execution system such as a computer/processor based system or an ASIC (Application Specific Integrated Circuit) or other system that can fetch or obtain the logic from computer-readable media and execute the instructions contained therein. "Storage medium" can be any medium that can contain, store, or maintain programs and data for use by or in connection with the instruction execution system. A storage medium can comprise any one of many physical media such as, for example, electronic, magnetic, optical, electromagnetic, or semiconductor media. More specific examples of suitable storage media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIG. 8-9 show specific orders of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:
1. A method, comprising:
    collecting, within a printer body, ambient light entering the printer body, wherein collecting the ambient light comprises preventing a light source within the printer body from emitting light while allowing the ambient light to enter the printer body;
    measuring characteristics of the collected ambient light;

identifying a color profile based on the measured characteristics; and providing the identified color profile for use in forming a color image on a medium.

2. The method of claim 1, wherein:

measuring comprises measuring the power spectral distribution of the collected ambient light; and identifying comprises identifying a color profile based on the measured power spectral distribution.

3. The method of claim 1, wherein collecting and measuring are performed utilizing a spectrophotometer positioned within the printer body, the spectrophotometer including:

a spectrometer for collecting emitted light from the light source and the ambient light.

4. The method of claim 3, wherein the spectrometer includes a shutter and wherein method includes utilizing the spectrometer to measure a first power spectral distribution with the shutter closed and wherein:

collecting comprises collecting, with the shutter open and the light source turned off, ambient light entering the printer body;

measuring comprises measuring a second power spectral distribution of the collected ambient light; and identifying comprises identifying a color profile based on a third power spectral distribution that is a function of the first and second power spectral distributions.

5. The method of claim 3, wherein the spectrophotometer is positioned adjacent to a media path within the printer body, the method comprising utilizing the spectrometer to measure a first power spectral distribution with light emitting from the light source reflecting from one of a print medium and a platen positioned within the media path, and wherein:

collecting comprises collecting, with the light source turned off, ambient light entering the printer body; and measuring comprises measuring a second power spectral distribution of the collected ambient light; and identifying comprises identifying a color profile based on a third power spectral distribution that is a function of the first and second power spectral distributions.

6. The method of claim 3, wherein the spectrophotometer is positioned within the printer body adjacent to a media path, the method comprising determining an operational mode of the spectrophotometer;

upon a first mode determination, collecting light projected from the light source and reflected from a target in the media path, measuring characteristics of the collected projected light, identifying a color based on the measured characteristics; and upon a second mode determination performing the acts of collecting the ambient light entering the printer body, measuring characteristics of the collected ambient light, identifying the color profile based on the measured characteristics, and providing the identified color profile for use in forming a color image on a medium.

7. The method of claim 6, wherein the spectrometer includes a shutter and wherein method includes, upon the second mode determination, utilizing the spectrometer to measure a first power spectral distribution with the shutter closed and wherein:

collecting the ambient light comprises collecting, with the shutter open and the light source turned off, ambient light entering the printer body;

measuring characteristics of the collected ambient light comprises measuring a second power spectral distribution of the collected ambient light; and identifying comprises identifying a color profile based on a third power spectral distribution that is a function of the first and second power spectral distributions.

8. A non-transitory computer readable medium containing instructions that when executed by a processor cause the processor to implement a method, the method comprising:

collecting, within a printer body, ambient light entering the printer body, wherein collecting the ambient light comprises preventing a light source within the printer body from emitting light while allowing the ambient light to enter the printer body;

measuring characteristics of the collected ambient light;

identifying a color profile based on the measured characteristics; and providing the identified color profile for use in forming a color image on a medium.

9. The medium of claim 8, wherein:

measuring comprises measuring the power spectral distribution of the collected ambient light; and identifying comprises identifying a color profile based on the measured power spectral distribution.

10. The medium of claim 8, wherein collecting and measuring are performed utilizing a spectrophotometer positioned within the printer body, the spectrophotometer including:

a spectrometer for collecting emitted light from the light source and the ambient light.

11. The medium of claim 10, wherein the spectrometer includes a shutter and wherein method includes utilizing the spectrometer to measure a first power spectral distribution with the shutter closed and wherein:

collecting comprises collecting, with the shutter open and the light source turned off, ambient light entering the printer body;

measuring comprises measuring a second power spectral distribution of the collected ambient light; and identifying comprises identifying a color profile based on a third power spectral distribution that is a function of the first and second power spectral distributions.

12. The medium of claim 10, wherein the spectrophotometer is positioned adjacent to a media path within the printer body, the method comprising utilizing the spectrometer to measure a first power spectral distribution with light emitting from the light source reflecting from one of a print medium and a platen positioned within the media path, and wherein:

collecting comprises collecting, with the light source turned off, ambient light entering the printer body; and measuring comprises measuring a second power spectral distribution of the collected ambient light; and identifying comprises identifying a color profile based on a third power spectral distribution that is a function of the first and second power spectral distributions.

13. The medium of claim 10, wherein the spectrophotometer is positioned within the printer body adjacent to a media path, the method comprising determining an operational mode of the spectrophotometer;

upon a first mode determination, collecting light projected from the light source and reflected from a target in the media path, measuring characteristics of the collected projected light, identifying a color based on to the measured characteristics; and upon a second mode determination performing the acts of collecting the ambient light entering the printer body, measuring characteristics of the collected ambient light, identifying the color profile based on the measured characteristics, and providing the identified color profile for use in forming a color image on a medium.

14. The medium of claim 13, wherein the spectrometer includes a shutter and wherein method includes, upon the second mode determination, utilizing the spectrometer to measure a first power spectral distribution with the shutter closed and wherein:

collecting the ambient light comprises collecting, with the shutter open and the light source turned off, ambient light entering the printer body;

measuring characteristics of the collected ambient light comprises measuring a second power spectral distribution of the collected ambient light; and identifying comprises identifying a color profile based on a third power spectral distribution that is a function of the first and second power spectral distributions.

15. A printer, comprising a body, a print engine, a color sensor, and a controller, wherein:

the color sensor and at least a portion of the print engine are positioned within the body;

the body is configured to allow ambient light to enter the body and reach the color sensor;

the controller is configured to:
cause the color sensor to collect, within the body, the ambient light and to measure characteristics of the collected ambient light, wherein to collect the ambient light comprises to prevent a light source within the printer body from emitting light while allowing ambient light to enter the printer body;

identify a color profile based on the measured characteristics; and cause the print engine to utilize the identified color profile to form a color image on a print medium.

16. The printer of claim 15, wherein the spectrophotometer includes:

a spectrometer for collecting the emitted light from the light source and the ambient light.

17. The printer of claim 16, wherein the spectrometer includes a shutter and wherein the controller is configured to:

cause the spectrometer to measure a first power spectral distribution with the shutter closed;

cause the spectrometer to collect the ambient light entering the printer body with the shutter open while causing the light source to be turned off;

cause the spectrometer to measure a second power spectral distribution of the collected ambient light; and identify a color profile based on a third power spectral distribution that is a function of the first and second power spectral distributions.

18. The printer of claim 16, wherein the spectrophotometer is positioned adjacent to a media path within the body, and the controller is configured to:

cause the spectrometer to measure a first power spectral distribution with light emitting from the light source reflecting from one of a print medium and a platen positioned within the media path;

cause the spectrometer to collect the ambient light entering the printer body with the shutter open while causing the light source to be turned off;

cause the spectrometer to measure a second power spectral distribution of the collected ambient light; and identify a color profile based on a third power spectral distribution that is a function of the first and second power spectral distributions.

19. The printer of claim 16, wherein the spectrophotometer is positioned within the printer body adjacent to a media path, and the controller is operable to set an operational mode of the spectrophotometer;

upon a first mode setting, the controller is configured to cause the spectrometer to collect light projected from the light source and reflected from a target in the media path, cause the spectrometer to measure characteristics of the collected projected light, and identify a color based on the measured characteristics; and upon a second mode determination the controller is configured to cause the spectrometer to collect the ambient light entering the body and to measure characteristics of the collected ambient light and to identify the color profile based on the measured characteristics.

20. The printer of claim 19, wherein the spectrometer includes a shutter and wherein, upon the second mode setting, the controller is configured to:

utilize the spectrometer to measure a first power spectral distribution with the shutter closed;

cause the spectrometer to collect the ambient light with the shutter open while causing the light source to be turned off;

cause the spectrometer to measure a second power spectral distribution of the collected ambient light; and identify a color profile based on a third power spectral distribution that is a function of the first and second power spectral distributions.

* * * * *